United States Patent [19]
Hiraiwa

[11] 3,815,714
[45] June 11, 1974

[54] FRICTION CLUTCH
[75] Inventor: Kazuyoshi Hiraiwa, Tokyo, Japan
[73] Assignee: Nissan Motor Company, Limited, Yokohoma City, Japan
[22] Filed: Sept. 25, 1972
[21] Appl. No.: 291,538

[30] Foreign Application Priority Data
Oct. 21, 1971 Japan.............................. 46-96737
Apr. 10, 1972 Japan.............................. 47-42343
Apr. 12, 1972 Japan.............................. 47-43274

[52] U.S. Cl. ......................... 192/70.25, 192/70.28
[51] Int. Cl. ........................................... F16d 13/75
[58] Field of Search............ 192/70.25, 70.28, 111 A

[56] References Cited
UNITED STATES PATENTS
3,128,862   4/1964   Ludwig........................... 192/70.28
3,700,084   10/1972  Nasu et al....................... 192/70.28
3,702,651   11/1972  Fujita et al..................... 192/70.28

Primary Examiner—Allan D. Herrmann

[57] ABSTRACT

A friction engaging-device having a flywheel, a pressure plate, a clutch disc with pacings on both sides and disposed between the flywheel and pressure plate, a clutch hub connected to the clutch disc to be movable therewith, a spring means for moving the pressure plate toward and away from the flywheel, and a release mechanism connected with the spring means, which device has incorporated therein a thrust means having a cylindrical portion tightly but slidably fitted in a bore formed in the pressure plate and a radially extending flat portion adapted to move the clutch hub and accordingly the clutch disc away from the flywheel upon release of the spring means whereby drive torque through the clutch disc is completely and immediately interrupted.

11 Claims, 9 Drawing Figures

FRICTION CLUTCH

This invention relates in general to friction-engaging devices for motor vehicles and, more particularly, to a friction clutch which is adapted to be quickly and completely disengaged upon release of the pressure engaging the same.

Friction clutches are commonly used in manually operated power transmission mechanisms of motor vehicles and generally employ one or more clutch discs which are interposed between a flywheel connected to an engine crankshaft and a pressure plate positioned relative to the flywheel. The clutch disc, provided with friction facings on both sides thereof, is secured to a clutch hub which is splined to an input shaft or main drive shaft of the power transmission mechanism so that the clutch disc is movable axially on the transmission input shaft. The pressure plate is loaded with a clutch spring being in a neutral position in which the pressure plate is biased to force the one or more clutch discs into engagement with the flywheel when the clutch is maintained in a coupled condition whereby drive torque is transmitted from the engine crankshaft to the transmission input or main drive shaft. The clutch spring is connected with a clutch release mechanism having a clutch release bearing and a withdrawal lever which is operatively connected to a clutch pedal. When, thus, the clutch pedal is depressed to bring the clutch into an uncoupled condition, this movement is transmitted to the withdrawal lever which, in turn, moves the clutch release bearing against the clutch spring, thereby relieving the spring pressure on the pressure plate and accordingly releasing the clutch disc or discs from the engine flywheel. It is, in this instance, important that the clutch disc or discs be completely and immediately retracted from the flywheel when the pressure plate is relieved from the spring pressure so that no drive torque is delivered to the transmission input shaft.

It is, therefore, an object of the present invention to provide an improved friction clutch for a motor vehicle which is capable of being quickly and completely disengaged when the pressure plate is moved away from the flywheel whereby the transmitted drive torque is completely interrupted between the crankshaft of the engine and the main drive shaft.

It is another object of the present invention to provide an improved friction clutch for a motor vehicle which is arranged to be quickly and completely disengaged by incorporating a simple means.

It is still another object of the present invention to provide an improved friction clutch for a motor vehicle which has a minimum number of component parts whereby the friction clutch is simplified in construction and economical to manufacture.

It is a still another object of the present invention to provide an improved friction clutch for a motor vehicle incorporating novel means for effecting quick and complete disengagement of the clutch disc upon release of the pressure engaging the clutch disc.

In order to achieve these objects of the present invention, there is provided an improved friction clutch which generally comprises a flywheel connected to and driven by the engine crankshaft, the pressure plate being positioned in spaced relationship with respect to the flywheel, and the clutch disc which is positioned between and engageable on its opposed sides with the flywheel and the pressure plate and which is mounted on the clutch hub splined to the main drive shaft. The pressure plate is movable toward and away from the flywheel so that the pressure plate is pressed against and retracted from the clutch disc. Spring means is provided which, when maintained in a compressed position, biases the pressure plate toward the flywheel for causing the pressure plate to press the clutch disc against the flywheel so that the clutch disc is held in its engaged position. This condition is interrupted by actuation of the clutch release means which is provided in connection with the spring means as previously mentioned. When this clutch release means is actuated in an operative position, then the spring means is forced to move the pressure plate away from the clutch plate. The clutch disc is consequently disengaged from the flywheel so that the drive torque through the clutch disc is interrupted.

The spring means forming part of the device thus constructed may be a coned disc spring which is attached halfway to a clutch cover. The coned disc spring is seated at one end on the downstream face of the pressure plate and has its opposite end positioned to be engageable with the clutch release means mentioned above. When the clutch release means is actuated and brought into engagement with the coned disc spring, then the disc spring is forced toward the clutch disc so that the axially movable plate to which the spring is connected is moved together with the pressure plate toward the flywheel.

The clutch release means, on the other hand, may comprise a clutch release bearing which is engageable with the foresaid spring means such as the coned disc spring and which is axially movable toward and away from the clutch disc. When the clutch release bearing is held in a position remote from the clutch disc, the same is released from the spring means. The spring thus assumes a neutral position. When the clutch release bearing is moved toward the clutdh disc and engages the spring means, then the spring means is forced toward the clutch disc so as to establish the uncoupled condition of the clutch.

In a preferred embodiment, the friction clutch also comprises an annular thrust means which is associated with the pressure plate for moving the clutch hub and accordingly the clutch disc away from the flywheel when the coned disc spring is biased to cause the pressure plate to move away from the flywheel whereby the clutch disc is quickly and completely disengaged from the flywheel to interrupt the drive torque therethrough.

These and other objects and advantages of the present invention will become more apparent from the following description when taken in conjunction with the accompanying drawings, in which:

Figure 1:
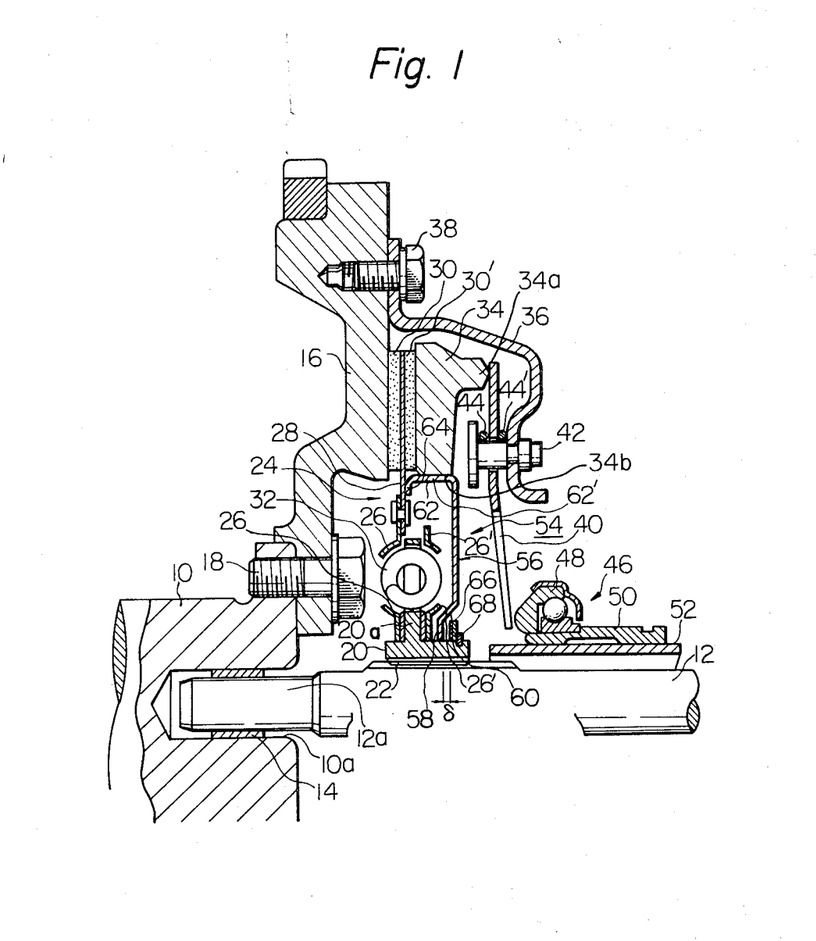
FIG. 1 is a longitudinal sectional view of a preferred embodiment of the friction clutch according to the present invention, the friction clutch being shown in its engaged condition.

Referring now to FIG. 1, there is shown in section a friction clutch according to the present invention which is specifically for use in a motor vehicle. In FIG. 1, the reference numeral 10 indicates a crankshaft which is driven from a motor vehicle engine (not shown) and reference numeral 12 the main drive shaft having an end portion 12a extending into an axial bore 10a formed in the crankshaft 10. The main drive shaft 12 is rotatable relative to the crankshaft 10 through a bearing 14. A flywheel 16 serving as a main driving plate is connected to the crankshaft 10 through a bolt 18 or any other suitable fastening means.

As shown in FIG. 1, a clutch hub 20 is provided which is splined at 22 to the main drive shaft 12 so as to be axially movable thereon, the clutch hub 20 having formed thereon an radial extension or flange portion 20a. This clutch hub 20 supports thereon the clutch disc which is generally designated by reference numeral 24. The clutch disc 24 is usually made up of disc mounts 26 and 26' which are fastened to both faces of the flange portion 20a of the clutch hub 20, a steel disc or cushioning plate 28 radially extending from the clutch disc mounts 26 and 26', and a pair of clutch friction facings 30 and 30'. These clutch friction facings 30 and 30' are usually shaped in annular form and one of them, which is shown as the facing 30, is so positioned as to be friction engageable with the adjacent face of the flywheel 16 when the friction-engaging plate 24 is held in its operative position as illustrated. Designated by reference numeral 32 is a vibration dampener which includes a coil spring (no numeral) received within the flange portion 20a of the clutch hub 20 and disposed in openings in the clutch disc mounts 26 and 26', as usual.

A pressure plate 34 is located adjacent to the clutch disc 24 in a manner to be engageable with the friction facing 30' of the plate 24. This pressure plate 34 is disposed within a clutch cover 36 which is secured to the flywheel 16 by a bolt 38. The pressure plate 34 has an inner wall or bore means 34a and a protruded portion 34b which is utilized for a reason that will be described in detail hereinafter.

A coned disc spring 40 is located in a position between the pressure plate 34 and the radial wall portion of the clutch cover 36 and secured halfway to the clutch cover 36 through a thrust rivet 42 which is loaded by thrust rings 44 and 44'. This coned disc spring 40 has its outer peripheral edge seated on the back face, shown as protruded as at 34a, of the pressure plate 34 and its inner peripheral edge surrounding the main drive shaft 12. The coned disc spring 40 thus biases the pressure plate 34 toward the flywheel 16 so that the clutch disc 24 is pressed against and rotatable with the flywheel 16 whereby the rotation of the crankshaft 10 is transmitted to the main drive shaft 12 through the clutch disc 24. The coned disc spring 40 is engageable with a clutch released mechanism 46, which includes a clutch release bearing 48 which is located to be engageable with the inner peripheral portion of the coned disc spring 40. The clutch release bearing 48 is supported on a sleeve 50 which is mounted on a clutch housing structure 52, a part of which is shown in FIG. 1. This clutch release bearing 48 can be moved toward the flywheel 16 by the movement of the withdrawal lever, not shown, with which the release bearing is operatively connected.

According to the present invention, an annular thrust member 54 is provided for immediately and completely disengaging the clutch disc 24 upon movement of the pressure plate 34 away from the flywheel 16. In the embodiment of FIG. 1, the annular thrust member 54 is shown to include axially and radially spaced flat portions 56 and 58 connected by a cone portion 60, a cylindrical portion 62 which is integrally formed with the radially extending flat portion 56, and a flange portion 64 radially inwardly extending from the extreme end of the cylindrical portion 62. The radially extending flat portion 58 of the annular thrust member 54 is disposed between the adjacent radially extending surface of the clutch disc mount 26' and a retainer ring or washer 66 held in position by a snap ring 68 which is received in a groove (not identified) formed in the clutch hub 20. It will be noted that the annular thrust member 54 is located between the clutch disc 24 and the retainer ring 66 so that when the pressure plate 34 is moved away from the flywheel 16, the flat portion 58 abuts on the retainer ring 66 to cause the clutch hub 20 to move away from the flywheel 16 whereby the clutch disc 24 is immediately and completely disengaged from the flywheel 16. To this end, the cylindrical portion 62 of the annular thrust member 54 is tightly but slidably fitted in the inner wall or bore means 34b formed in the pressure plate so as to be movable with the pressure plate 34 and positioned in such a manner that when the friction-engaging plate 24 is held in its engaging position, the flange portion 64 integral with the cylindrical portion 62 engages the adjacent face of the clutch disc 24 whereas the clearance $\delta$ is provided between the flat portion 58 and the retainer ring 66 to permit slight axial movement of the clutch hub 20 relative to the annular thrust member 54 and the pressure plate 34.

Figure 2:
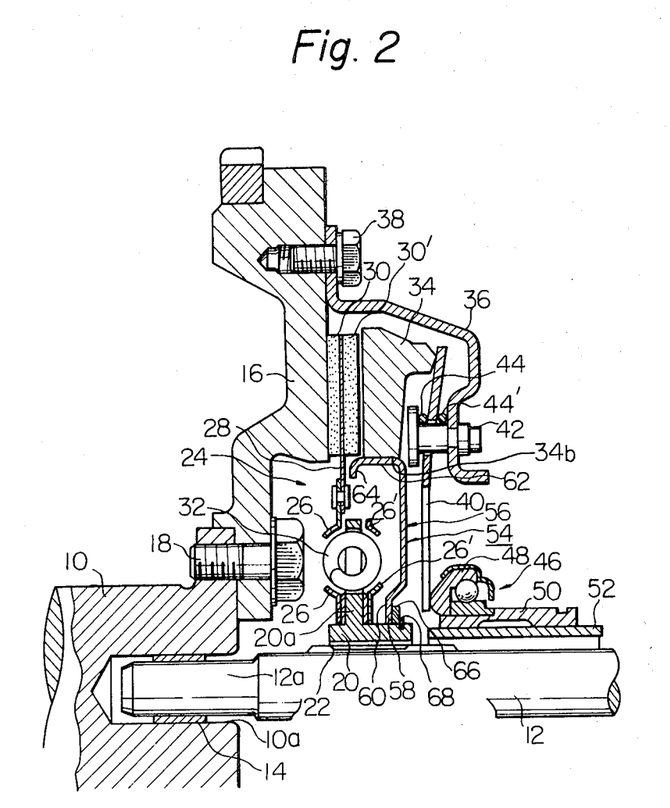
FIG. 2 is a view similar to FIG. 1 but showing the friction clutch in its disengaged condition.

When, now, the withdrawal lever (not shown) is actuated, the clutch release bearing 48 is moved leftwardly of the drawing to press upon the coned disc spring 40 so that the disc spring 40 is moved or deformed to a position in which the pressure plate 34 is freed from the spring action of the coned disc spring 40 and retracted from the clutch disc 24. In this instance, if the pressure plate 34 is moved rightwardly of the drawing for a distance $\delta$, the flat portion 58 of the annular thrust member 54 engages the adjacent surface of the retainer ring 66 to bias the clutch hub 20 rightwardly of the drawing. At the same time, a gap corresponding to the distance $\delta$ is formed between the pressure plate 34 and the facing 30' of the clutch disc 24. As the pressure plate 34 further moves rightwardly of the drawings, the flat portion 58 of the annular thrust plate 54 presses upon the retainer ring 66 as seen in FIG. 2 and, therefore, the clutch hub 20 and accordingly the clutch disc 24 is moved away from the flywheel 16. Thus, the facings 30 and 30' are disengaged from the flywheel 16 and the pressure plate 34 so that the drive torque is completely interrupted from being transmitted from the flywheel 16 to the main drive shaft 12.

As has previously mentioned, it is an important feature of the present invention that, since the cylindrical portion 62 of the annular thrust member 54 is slidably fitted in the bore of the pressure plate 34, the clearance δ between the flat portion 58 and the retainer ring 66 is maintained at a constant value because, if the facings 30 and 30' are worn thin, the pressure plate 34 is caused to slide on the cylindrical portion 62 of the thrust member 54 due to the force exerted by the coned disc spring 40. It will thus be seen that by suitably determining the size of the cylindrical portion 62 of the thrust plate 56, the clearance between the flat portion 58 and the retainer ring 66 is maintained within a limited suitable range for effecting reliable disengagement of the friction-engaging plate 24.

Figures 3, 4, 5:
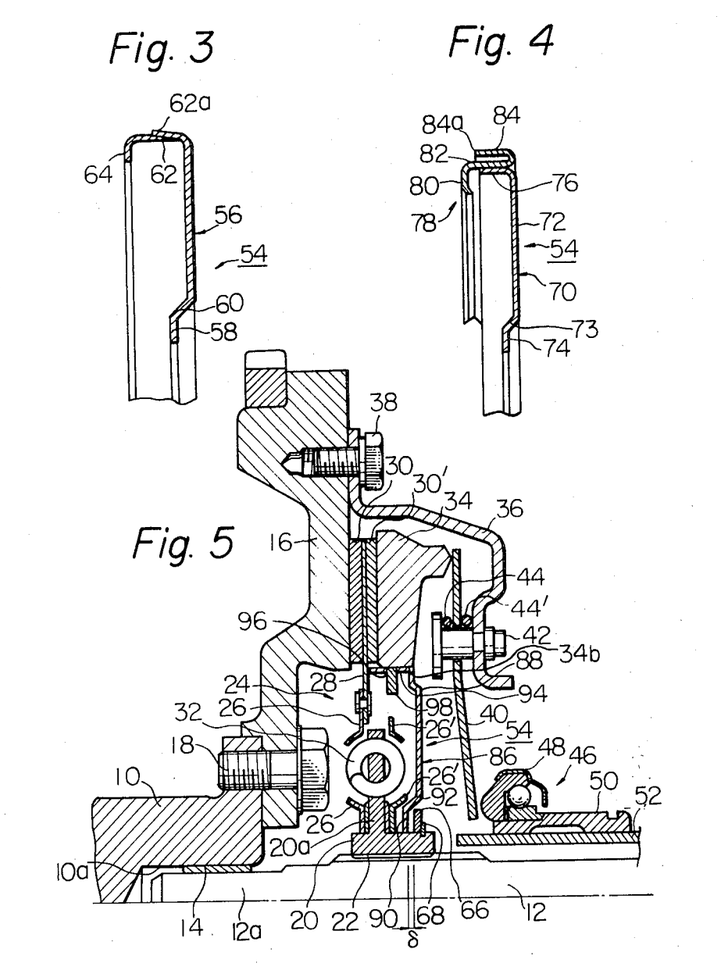
FIG. 3 is a schematic fragmentary sectional view illustrating, on an enlarged scale, a modified form of an essential part of the device shown in FIG. 1.
FIG. 4 is a schematic fragmentary sectional view illustrating, on an enlarged scale, another modified form of the essential part of the device shown in FIG. 1.
FIG. 5 is a longitudinal sectional view of a modified form of the friction clutch according to the present invention, the friction clutch being shown in its engaged condition.

A modified form of the annular thrust plate shown in FIG. 1 is illustrated in FIG. 3, wherein like or corresponding component parts are designated by the same reference numeral as those used in FIG. 1. In this modification, the cylindrical portion 62 of the annular thrust member 54 is formed with a claw means 62a which projects slightly outwardly. With this arrangement, when the cylindrical portion 62 is received within the bore 34b of the pressure plate 34, the claw means 62a engages with the periphery of the bore 34b of the pressure plate 34 so that the pressure plate 34 is permitted to move only in one direction with a suitable force applied whereby the clearance between the flat portion 58 and the retainer ring 66 is maintained within a predetermined value at all times even if the facings 30 and 30' are worn out.

Another modified form of the thrust member 54 is illustrated in FIG. 4, wherein like or corresponding component parts are designated by the same reference numerals as those used in FIG. 1. In this modification, the annular thrust member 54 is shown to include a first annular plate 70 having radially and axially spaced flat portions 72 and 74 connected by a cone portion 73 and cylindrical portion 76 which is integral with the radially extending flat portion 72, and a second annular plate 78 having a radially extending flange portion 80, a cylindrical portion 82 which is fitted on the cylindrical portion 76 of the first annular plate 70, and a bent end portion 84 which is integral with the cylindrical portion 82 and which has an edge 84a extending slightly radially outwardly to provide the same function as the claw means 62a of FIG. 3. The flange portion 80 of the second plate 78 selectively engages the clutch disc 24 when the annular thrust member 54 is assembled into the friction clutch shown in FIG. 1 and serves in a manner as previously mentioned.

Figure 6:
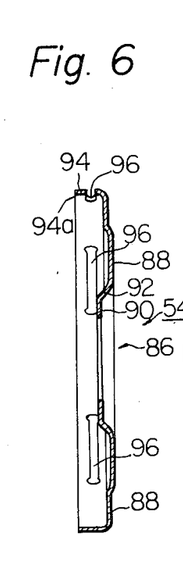
FIG. 6 is a longitudinal sectional view illustrating, on an enlarged scale, an essential part of the device shown in FIG. 5.
Figure 7:
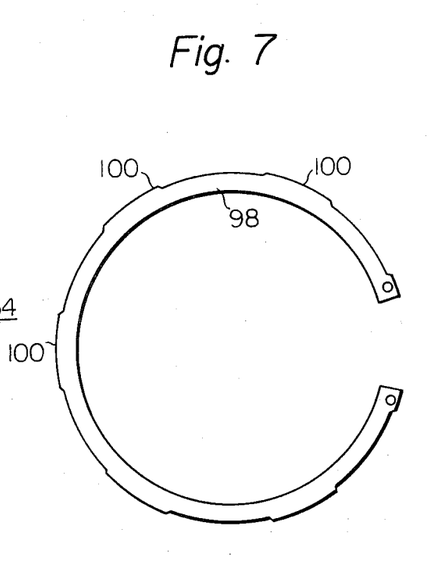
FIG. 7 is a schematic view illustrating, on an enlarged scale, another essential part of the friction clutch shown in FIG. 5.

Another preferred embodiment of the friction clutch is shown in FIGS. 5, 6 and 7, wherein like or corresponding component parts are designated by the same reference numerals as those used in FIG. 1. This embodiment differs from the friction clutch of FIG. 1 only in that the annular thrust member 54 is slightly modified and, therefore, the detailed description of the other component parts are herein omitted for the simplicity of description. In this illustrated embodiment, the annular thrust member 54 is shown to include an annular plate 86 having radially axially spaced flat portions 88 and 90 connected by a cone portion 92, a cylindrical portion 94 which is tightly but slidably fitted in the bore 34b of the pressure plate 34 and which has formed therein a plurality of elongate slots 96, and a ring 98 having a plurality of projections 100 which extend radially outward. When assembling, the ring 98 is inserted into the bore 34b of the pressure plate 34 and has a spring action to permit the pressure plate 34 to move on the annular thrust plate 86 so that the clearance δ is maintained at a certain value as previously described.

More specifically, the radial outwardly extending projections 100 of the ring 98 are inserted into the corresponding elongate slots 96. As seen in FIG. 5, the edge portion 94a of the cylindrical portion 94 of the annular thrust member 86 is arranged to engage the clutch disc 24 when the clutch disc 24 assumes its engaging position and functions in a manner as already mentioned hereinabove. The operation of the friction clutch of FIG. 5 is the same as that of the friction clutch shown in FIG. 1 and, therefore, the detailed description of the same will be herein omitted.

Figure 8:
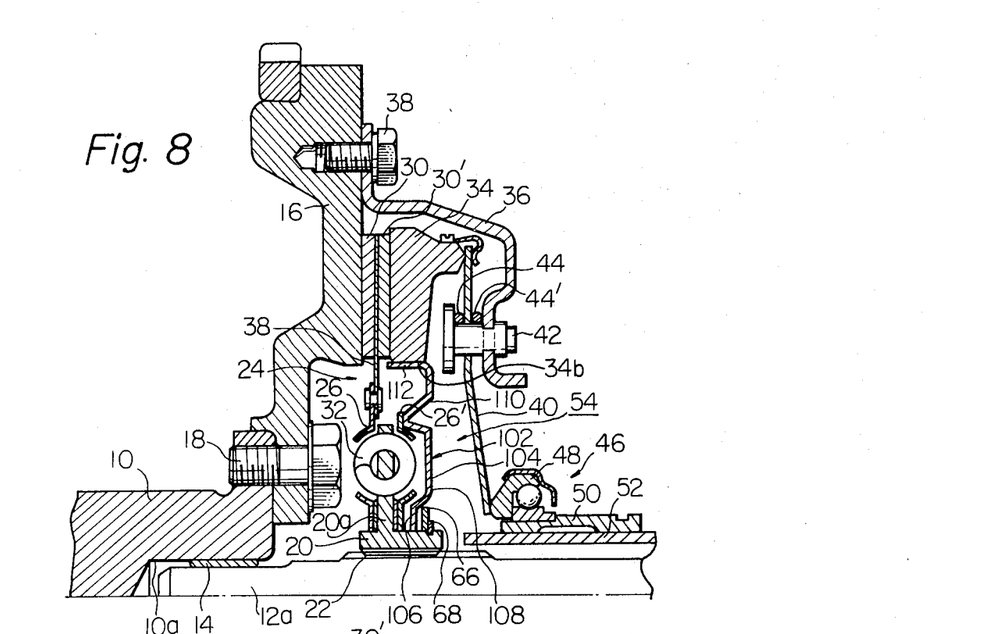
FIG. 8 is a longitudinal sectional view of another modified form of the friction clutch according to the present invention, the friction clutch being shown in its engaged condition.

A still another preferred embodiment of the friction clutch is illustrated in FIG. 8, wherein like or corresponding component parts are designated by the same reference numerals as those used in FIG. 1. This embodiment differs from the friction clutch of FIG. 1 in that a modified form of the annular thrust member 54 is used instead of the structure employed in the embodiment of FIG. 1. In this illustrated embodiment, the annular thrust member 54 is shown to include an annular plate 102 having radially and axially spaced flat portions 104 and 106 connected by a cone portion 108, the flat portion 106 being interposed between the adjacent radially extending surface of the clutch disc mount 26' and the retainer ring 66 supported by the snap ring 68, an annular recess or detent 110 formed in the flat portion 104 and having its inner surface abutting on the adjacent radially extending surface of the clutch disc mount 26', and a cylindrical portion 112 which is tightly but slidably fitted in the bore 34b of the pressure plate 34.

It will be appreciated that, when the clutch disc 24 is held in its engaging condition, the annular detent 110 of the thrust member 54 abuts on the adjacent radially extending surface of the clutch disc mount 26' and thus a clearance δ is provided between the flat portion 106 of the thrust member 54 and the retainer ring 66. If the pressure plate 34 is moved away from the flywheel 116, the detent 110 of the thrust member 54 disengages the adjacent surface of the clutch disc mount 26'. As the pressure plate is further moved away from the flywheel 16, then the flat portion 106 of the thrust member 54 abuts on the retainer ring 66 to push the clutch hub 20 away from the flywheel 16 so that the clutch disc 24 quickly and completely disengages the flywheel 16. If the facings 30 and 30' are worn out, the pressure plate 34 is caused to slide on the cylindrical portion 112 of the thrust member 54 by the force caused by the coned disc spring 40 and, therefore, the clearance δ between the flat portion 106 of the thrust member 54 and the retainer ring 66 is maintained at a constant value. Thus, a quick and complete disengagement of the clutch disc 24 is obtained.

Figure 9:
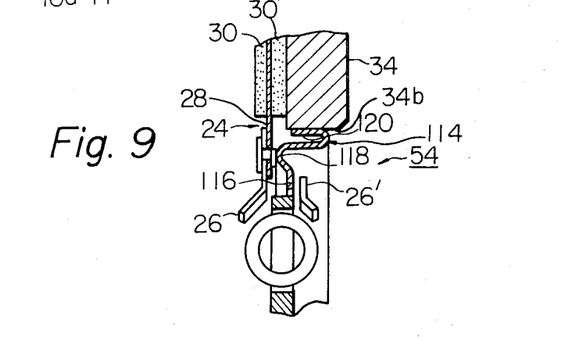
FIG. 9 is a longitudinal fragmentary sectional view of a further modified form of the friction clutch according to the present invention.

A modified form of the friction clutch is fragmentarily illustrated in FIG. 9, wherein like or corresponding parts are designated by the same reference numerals as those used in FIG. 1. In this modification, the retainer ring and the snap ring for supporting the same are dispensed with and the clutch disc mount 26' is utilized instead of the retainer ring. Moreover, the thrust member 54 includes an annular plate 114 having a radially extending flat portion 116 which is disposed between the clutch disc mounts 26 and 26', an annular detent or recess 118 having its outer surface abutting on the clutch disc 28 of the friction-engaging plate 24, and a cylindrical portion 120 which is contiguous with the annular detent 118 and which is tightly but slidably fitted in the bore 34b of the pressure plate 34.

It will be understood that, in the illustrated embodiment of FIG. 9, the flat portion 116 of the thrust member 54 abuts on the clutch disc mount 26' when the pressure plate 34 is moved away from the flywheel (not seen in FIG. 9) whereby the clutch hub (not shown) and accordingly the clutch disc 24 are moved away from the flywheel and thus a quick and complete disengagement of the clutch disc 24 will be obtained.

It will now be appreciated from the foregoing description that the friction clutch according to the present invention is capable of quickly and completely disengaging the crank shaft from the drive shaft whereby the drive torque is interrupted from the crankshaft to the main drive shaft.

While several embodiments of the present invention have been herein shown and described in association with the accompanying drawings, they are intended to merely exemplify the friction clutch according to the present invention and it should be understood that the friction clutch according to the present invention may be modified in many respects without departing from the scope of the present invention which is defined in the appended claims.

What is claimed is:

1. A friction clutch for use in an engine driven vehicle comprising, in combination: a flywheel mounted on the engine crankshaft for rotation with the crank shaft about a longitudinal axis; a pressure plate spaced apart from said flywheel and axially movable along said axis, said pressure plate having a bore means; a rotatably mounted shaft concentric with said flywheel and said pressure plate; a clutch hub splined to said rotatably mounted shaft and axially movable along said axis; a clutch disc mounted on said clutch hub and axially movable therewith along said axis, said clutch disc having friction facings on both sides thereof; and a thrust means frictionally connected with said pressure plate for moving said clutch hub when said pressure plate is moved away from said flywheel for thereby effecting quick and complete disengagement of said clutch disc to interrupt drive torque therethrough.

2. A friction clutch as claimed in claim 1, wherein said thrust means includes an annular plate having radially and axially spaced flat portions connected by a cone portion, a cylindrical portion contiguous with one of said flat portions, and a flange portion contiguous with said cylindrical portion and abutting on said clutch disc when said pressure plate is urged toward said flywheel, said cylindrical portion being tightly but slidably fitted in said bore means of said pressure plate, whereby, when said friction facings of said clutch disc are worn out, said pressure plate is caused to slide on said cylindrical portion of said thrust means to maintain the axial movement of the other one of said flat portions relative to said clutch hub within a constant value for thereby effecting quick and complete disengagement of said clutch disc.

3. A friction clutch as claimed in claim 2, wherein said other one of said flat portions is disposed between one of clutch disc mounts connected to said clutch hub and a retainer ring supported thereon.

4. A friction clutch as claimed in claim 3, wherein said cylindrical portion of said thrust means includes a claw means outwardly projecting slightly radially.

5. A friction clutch as claimed in claim 1, wherein said thrust means includes a first annular plate having radially and axially spaced flat portions connected by a cone portion, and a cylindrical portion which is integral with one of said flat portions, and a second annular plate having a radially extending flange portion to abut on said clutch disc when said pressure plate is urged toward said flywheel, a cylindrical portion fitted on the cylindrical portion of said first annular plate, and a bent end portion which is integral with the last-named cylindrical portion and which has an edge extending slightly radially outwardly said bent end portion being tightly but slidably fitted in the bore means of said pressure plate, where, when said facings are worn out, said pressure plate is caused to slide on said bent portion of said thrust means to maintain the axial movement of one of said flat portions of said first annular plate relative to said clutch hub within a constant value for thereby effecting complete and quick disengagement of said clutch disc.

6. A friction clutch as claimed in claim 1, wherein said thrust means includes an annular plate having radially and axially spaced flat portions connected by a cone portion, and a cylindrical portion having formed therein a plurality of elongate slots, and a ring having a plurality of projections extending radially outwardly which are inserted into said plurality of elongate slots formed in said cylindrical portion and which has a spring action, said cylindrical portion of said annular plate and said projections of said ring being tightly but slidably fitted in the bore means of said pressure plate, whereby, when said friction facings are worn out, said pressure plate is caused to slide on said cylindrical portion and on said projections of said ring to maintain the axial movement of one of said flat portions of said annular plate relative to said clutch hub within a constant value for thereby effecting quick and complete disengagement of said clutch disc.

7. A friction clutch as claimed in claim 6, wherein said one of said flat portions of said annular plate is disposed between one of clutch disc mounts connected to said clutch hub and a retainer ring supported thereon.

8. A friction clutch as claimed in claim 6, wherein said cylindrical portion of said annular plate has an edge adapted to abut on said clutch disc when said pressure plate is urged toward said flywheel.

9. A friction clutch as claimed in claim 1, wherein said thrust means includes an annular plate having radially and axially spaced flat portions connected by a cone portion, a detent means formed in one of said flat portions and adapted to abut on one of said clutch disc mounts connected to said clutch hub, and a cylindrical portion which is integral with said one of said flat portions, said cylindrical portion being tightly but slidably fitted in said bore means of said pressure plate, whereby, when said friction facings are worn out, said pressure plate is caused to slide on said cylindrical portion due to the pressure exerted thereon to maintain the axial movement of said other one of said flat portions with respect to said clutch hub within a constant value for thereby effecting quick and complete disengagement of said friction-engaging plate.

10. A friction clutch as claimed in claim 9, wherein said other one of said flat portions is disposed between one of said clutch disc mounts connected to said clutch hub, and a retainer ring supported thereon.

11. A friction clutch as claimed in claim 1, wherein said thrust means includes an annular plate having a radially extending flat portion disposed between clutch disc mounts connected to said clutch hub, an annular detent means integral with said flat portion and adapted to abut on said friction-engaging plate when said pressure plate is urged toward said flywheel, and a cylindrical portion integral with said detent means, said cylindrical portion being tightly but slidably fitted in the bore means of said pressure plate, whereby, when said friction facings are worn out, said pressure plate is caused to slide on said cylindrical portion due to the pressure exerted thereon to maintain the axial movement of said flat portion relative to one of said clutch disc mounts within a constant value for thereby effecting quick and complete disengagement of said friction-engaging plate.

* * * * *